United States Patent [19]

Schrenk et al.

[11] Patent Number: 5,094,793

[45] Date of Patent: Mar. 10, 1992

[54] METHODS AND APPARATUS FOR GENERATING INTERFACIAL SURFACES

[75] Inventors: Walter J. Schrenk; Ranganath K. Shastri; Ralph E. Ayres, all of Midland; Daniel J. Gosen, Saginaw, all of Mich.

[73] Assignee: The Dow Chemical Company, Midland, Mich.

[21] Appl. No.: 632,448

[22] Filed: Dec. 21, 1990

[51] Int. Cl.⁵ .............................. B29C 47/06
[52] U.S. Cl. .................... 264/171; 264/173; 366/340; 425/131.1; 425/133.5; 425/462
[58] Field of Search ............. 264/171; 425/131.1, 425/133.5, 462

[56] References Cited

U.S. PATENT DOCUMENTS

| | | | |
|---|---|---|---|
| 3,557,265 | 1/1971 | Chisholm et al. | 264/171 |
| 3,565,985 | 2/1971 | Schrenk et al. | 425/131.1 |
| 3,759,647 | 9/1973 | Schrenk et al. | 264/171 |
| 3,773,882 | 11/1973 | Schrenk | 264/171 |
| 3,884,606 | 5/1975 | Schrenk | 264/171 |
| 4,426,344 | 1/1984 | Dinter et al. | 425/131.1 |
| 4,435,141 | 3/1984 | Weisner et al. | 264/171 |

FOREIGN PATENT DOCUMENTS

| | | | |
|---|---|---|---|
| 3229554 | 3/1984 | Fed. Rep. of Germany | 264/171 |
| 55-154127 | 12/1980 | Japan | 425/133.5 |
| 55-154128 | 12/1980 | Japan | 425/133.5 |

Primary Examiner—Jeffery Thurlow

[57] ABSTRACT

Method and apparatus for generating interfacial surfaces in a fluid mass which:
(a) divide a first stream of the fluid mass into a plurality of branch streams, redirect or reposition the branch streams, expand and contract the branch streams in a symmetrical fashion, and recombine the branch streams to form a second stream of the fluid mass; or
(b) divide a first stream of the fluid mass into a plurality of branch streams, redirect or reposition the branch streams, recombine the branch streams to form a second stream of the fluid mass, and expand and contract the second stream in a symmetrical fashion.

20 Claims, 8 Drawing Sheets

METHODS AND APPARATUS FOR GENERATING INTERFACIAL SURFACES

FIELD OF THE INVENTION

This invention relates to interfacial surface generators and to methods of generating interfacial surfaces in a fluid mass.

BRIEF DESCRIPTION OF THE PRIOR ART

Multilayer films have been made or suggested to be made previously through the use of complex coextrusion feedblocks, see. e.g., U.S. Pat. No. 3,773,882 and 3,884,606 to Schrenk. These complex feedblocks are difficult and expensive to manufacture, however, and are not easily adapted to different applications.

Multilayer films have also been made or suggested to be made by a combination of a simpler feedblock with one or more interfacial surface generators (ISG's) in series, see, e.g., U.S. Pat. No. 3,565,985 to Schrenk et al. This apparatus is easier and less costly to make and assemble, and by changing the type and/or number of ISG's used in series enables the economical manufacture of films having from a few to many layers.

Previous ISG's have not been designed for the manufacture of multilayer films, however, but for the mixing of highly viscous materials such as melts of various thermoplastics.

These known ISG's have operated generally by forcing the viscous fluids to be mixed through a series of passageways which repeatedly separate and recombine stream elements during the flow of a stream of viscous fluids through the apparatus, with the intent generally of creating interfacial surfaces by repeated divisions of layers or aggregations generally of a given material Distortions and disruptions of the layers in a given stream of materials result from such divisions and recombinations, so that a second stream of materials exiting even a single ISG may depart significantly from the desired character and/or configuration of the layers in a coextruded first composite stream from the feedblock. These distortions are multiplied where several ISG's are used in series, as may be necessary for the creation of a second stream having the desired number of layers.

SUMMARY OF THE INVENTION

The present invention offers in a first embodiment a method and apparatus for generating interfacial surfaces within a fluid mass by dividing a first stream of the fluid mass into a plurality of branch streams, redirecting or repositioning these branch streams, expanding and contracting the branch streams in a symmetrical fashion, and recombining the branch streams to form a second stream of the fluid mass. In a second, alternate embodiment, the branch streams are recombined to form the second stream, and the second stream is expanded and contracted in a symmetrical fashion.

Where the entering first stream comprises discrete overlapping layers of polymeric material, with at least a pair of such discrete overlapping layers defining an essentially planar layer interface therebetween, the present invention by the symmetrical expansion and contraction of the branch streams or the second stream limits the distortions and disruptions normally attendant to the division and recombination of the first composite stream of materials in a conventional ISG.

Thus, while the ISG of the present invention can be used for the conventional purpose of intimately mixing viscous fluids, it is particularly designed to be useful also in the manufacture of multilayer films from a first composite stream.

DETAILED DESCRIPTION OF THE DEPICTED EMBODIMENTS

As suggested in the summary description above of the drawings, an apparatus or element of the present invention in a first embodiment comprises three functionally distinct but not necessarily physically separable sub-elements—one for the dividing and redirecting or repositioning steps of the method, one for expanding the branch streams so created and repositioned, and one for contracting the branch streams and recombining them into an integrated whole.

While these steps may be discretely and sequentially performed, it will be understood that for example the expanding and contracting steps may be combined or overlap if desired in a second sub-element, with the third sub-element being primarily adapted for accomplishing the recombination step while perhaps also performing some or all of the contracting function as well. Similarly, the third element may complete the expanding step before or while contracting and recombining the branch streams.

Figure 1:
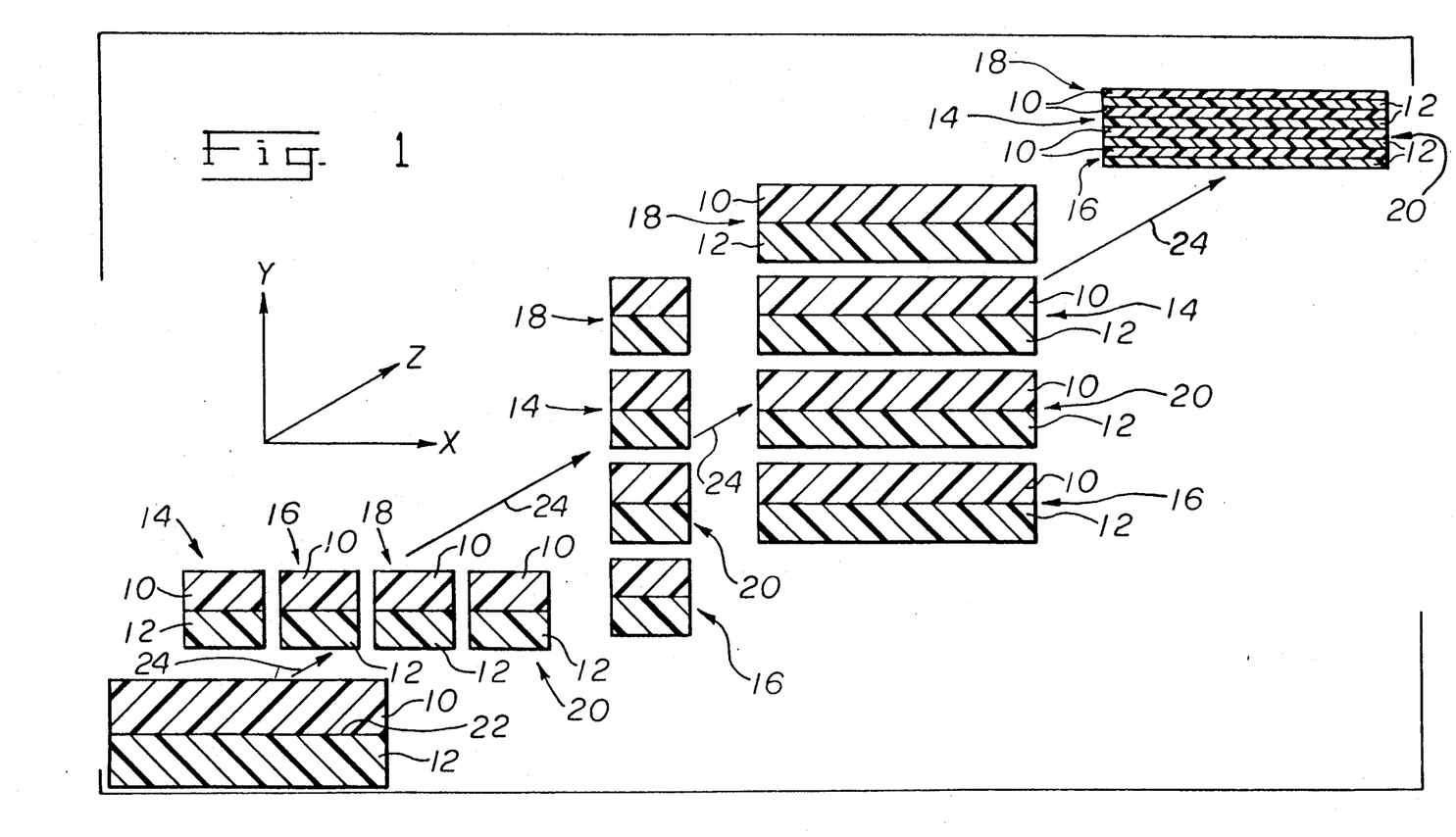
FIG. 1 is a schematic illustration of the practice of a method of the present invention for forming a multilayer stream from a first composite stream comprising two discrete and substantially continuous layers of diverse thermoplastic materials.

The performance of the dividing, repositioning, expanding, contracting and recombining steps by these three sub-elements will typically and preferably be as shown schematically in FIG. 1. As may be seen by reference to that drawing, a layered first composite stream of two discrete and continuous layers 10 and 12 of diverse thermoplastic materials, such as might proceed from a conventional coextrusion feedblock, enters the ISG and is divided into four branch streams 14, 16, 18 and 20 within the first sub-element.

It is to be understood that a "conventional coextrusion feedblock" as used in the preceding paragraph embraces a multilayer feedblock, such as disclosed in U.S. Pat. No. 3,773,882 to Schrenk. The first composite stream can thus comprise a number of layers and materials substantially exceeding the two layers shown in FIG. 1. The illustrated first composite stream has been selected, however, in the interest of simplifying as much as possible the explanation and description of the present invention.

The layered first composite stream defines a planar layer interface 22 between the layers 10 and 12 which lies generally in the x-z plane of an x-y-z coordinate system, wherein the z-direction is taken as corresponding to the direction of fluid flow generally through the apparatus (shown by the arrows 24 in FIG. 1), the x-direction defines a transverse dimension of the interface 22 and layers 10 and 12, and the y-direction is in the thickness direction of the layers 10 and 12 and extends generally perpendicularly away from the planar layer interface 22.

The division of the first composite stream is generally along the x-axis, so that the planar layer interface 22 is divided up generally among two or more of the branch streams 14, 16, 18 and 20, depending on the extent of the layers 10 and 12 and thus of the layer interface 22 in the x-direction. Where the layers 10 and 12 span the first composite stream as shown in FIG. 1, the layer interface 22 is thus divided among each of the branch streams 14, 16, 18 and 20.

At least the two or more branch streams between which the interface 22 was divided, and preferably all of the branch streams 14, 16, 18 and 20 are then redirected and repositioned with respect to both the x- and y-axes and with respect to one another in flowing through the conduits of the first sub-element, so that at the exit of the first sub-element the streams 14, 16, 18 and 20 are preferably stacked along the y-axis. Or, expressed differently, the branch streams 14, 16, 18, and 20 are in flowing through the first sub-element divergently displaced along the "y" axis from their original positions while being convergently displaced along the "x" axis.

In the second sub-element, at least the two or more branch streams and preferably each of the stacked branch streams 14, 16, 18 and 20 independently undergo a progressive symmetrical expansion along the x-axis (in the plane of the layer interface 22 of greatest interest) in their transverse (or x) dimension, preferably until the transverse width of a branch stream is substantially as great as the width of the first composite stream entering the apparatus. This expansion is initiated from a central location in the apparatus along the y-axis, and occurs uniformly with respect to each of the layers 10 and 12 in a given branch stream as shown. Preferably the branch streams 14, 16, 18 and 20 also expand uniformly with respect to one another as shown.

At the exit of the second sub-element, the branch streams 14, 16, 18 and 20 enter into the third sub-element wherein at least the two or more branch streams and preferably each of the branch streams 14, 16, 18 and 20 independently undergo a similar progressive symmetrical contraction or reduction of their thickness along the y-axis or in the y-direction and are recombined to form a layered second composite stream. The contraction of each branch stream occurs evenly along the x-axis (i.e., in the plane of the layer interface 22) with respect to the layers 10 and 12 in a given branch stream as shown, and preferably also occurs evenly or uniformly from branch stream to branch stream.

An apparatus for performing the steps schematically illustrated in FIG. 1 may be understood by reference to FIGS. 2-14, wherein a first embodiment of the ISG apparatus as a whole is denoted by the numeral 26.

Figure 2:
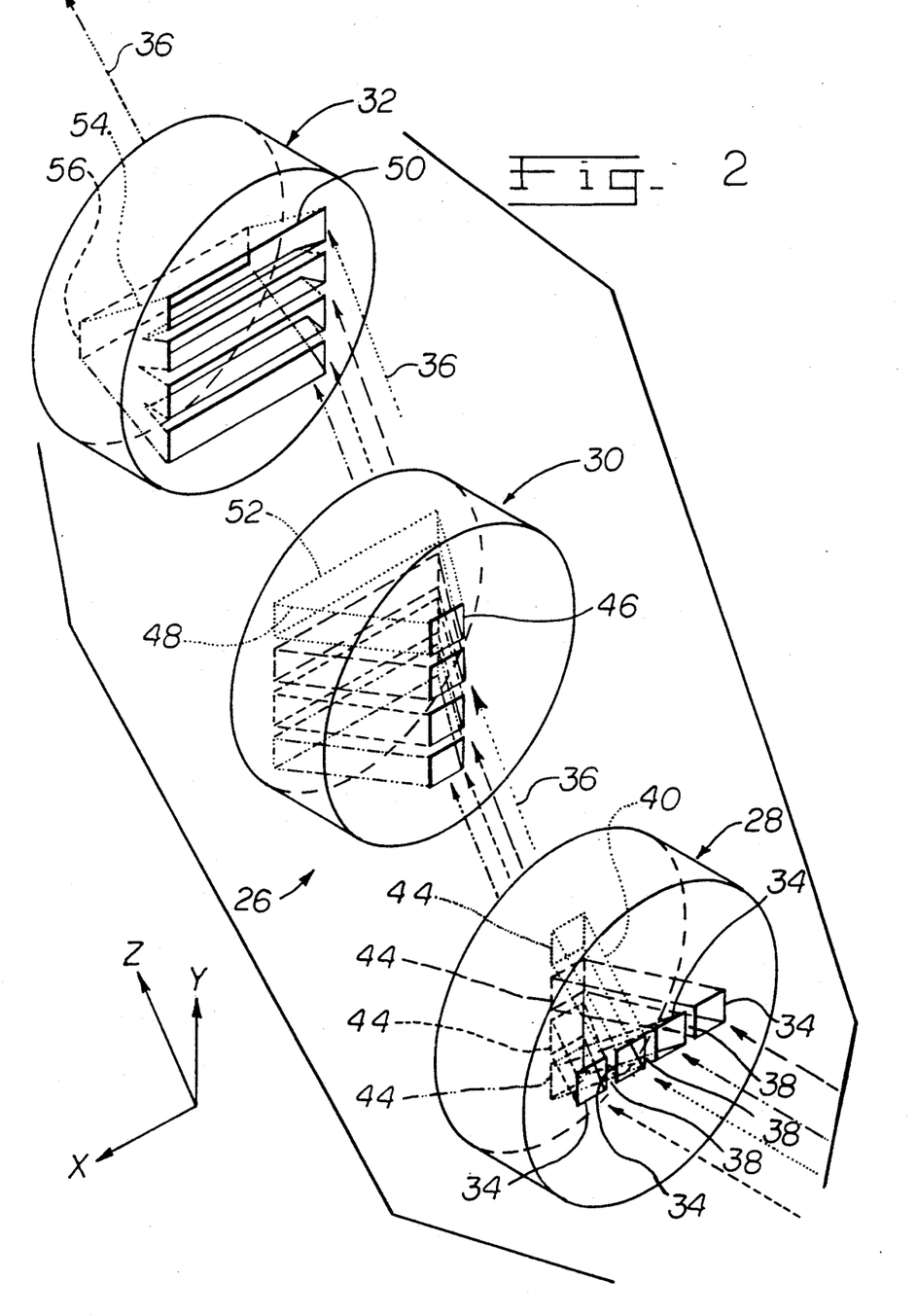
FIG. 2 is an isometric view of a first embodiment of an apparatus of the present invention as a whole.

In FIG. 2, the ISG 26 comprises first, second, and third sub-elements 28, 30, and 32. A first composite stream comprised of discrete overlapping layers of diverse polymeric or thermoplastic materials, of which at least one pair defines a generally planar layer interface therebetween lying generally in an x-z plane, enters the ISG 26 through regularly-shaped inlet openings 34 in the first sub-element 28 and flows through the elements 28, 30 and 32 as indicated by the arrows 36.

Referring now to FIGS. 3 through 6, it can be seen that these inlet openings 34 have preferably substantially identical rectangular or square cross-sections and are aligned generally along the x-axis in the previously-defined x-y-z coordinate system. The four inlet openings 34 are defined by three dividing wall portions 38 (FIG. 2) which can serve as dividing means for dividing the first composite stream of FIG. 1 into the four separate branch streams 14, 16, 18, and 20.

The branch streams 14, 16, 18, and 20 in the first sub-element 28 proceed from the inlet openings 34 through first conduits 40 (FIG. 3-6). These first conduits 40 act as means for redirecting or repositioning each of the streams 14, 16, 18, and 20 with respect to both of the x and y axes, the general direction and degree of displacement associated with each conduit 40 being indicated by the arrows 42 in FIGS. 3-6. Preferably these conduits 40 are substantially of the same length.

Figures 3, 4:
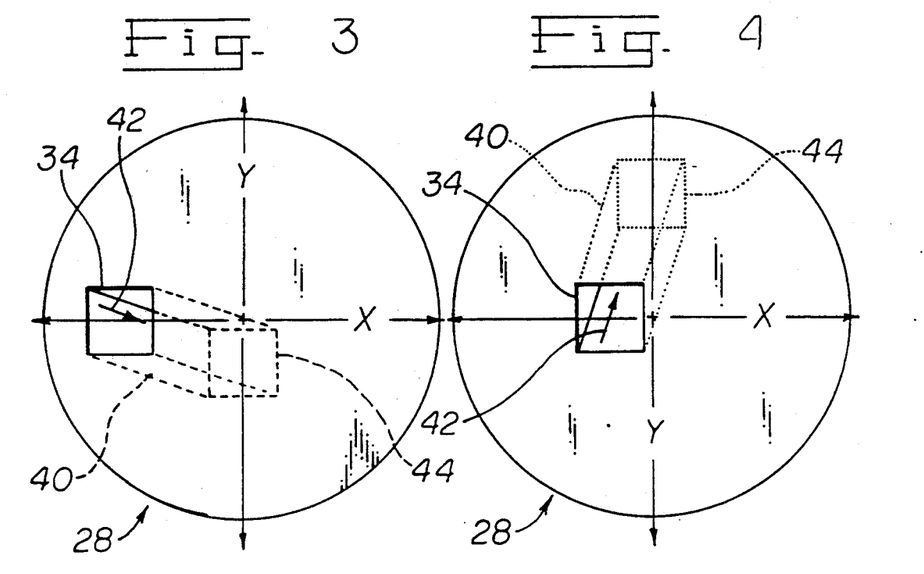
FIG. 3-6 are views in isolation of conduits within a first portion or sub-element of the apparatus of FIG. 2, taken from the front or upstream side of the first sub-element and showing the flow paths of fluids moving through the apparatus and through the conduits.
Figure 5:
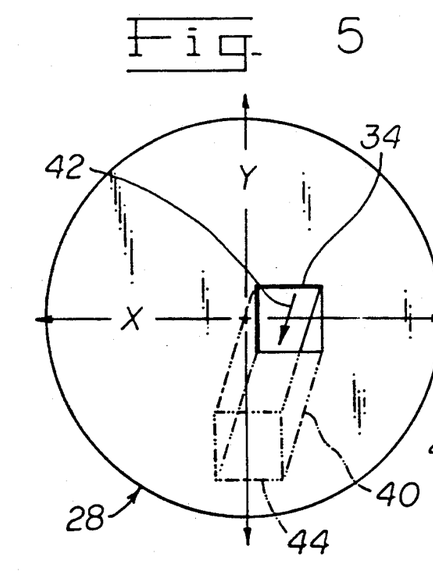
Figure 6:
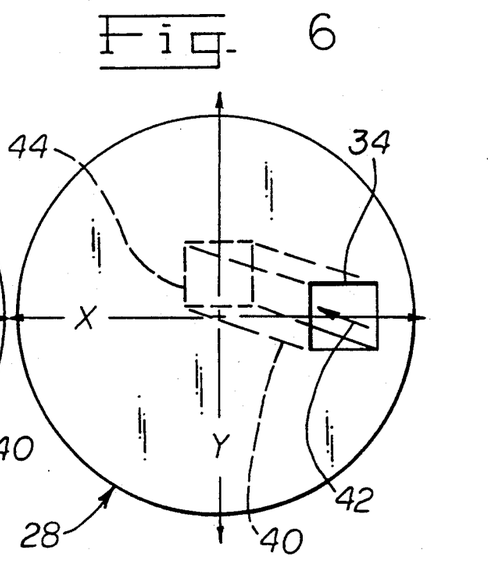
Figure 7:
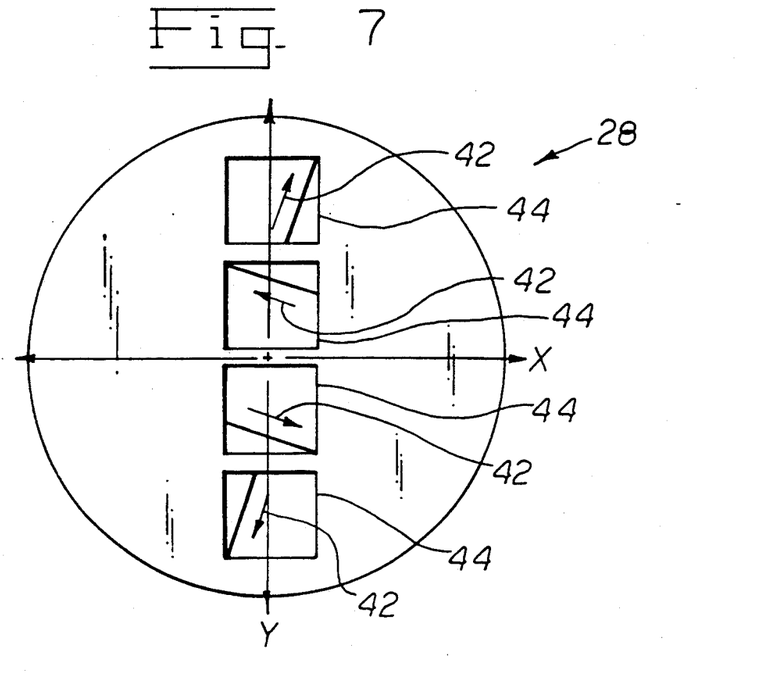
FIG. 7 is a rear or downstream face view of the first sub-element shown in FIGS. 3-6.

The streams 16 and 18 entering through the inner two inlet openings 34 are displaced to the greatest extent along the y-axis and the least along the x-axis (see FIGS. 4 and 5). Similarly, the branch streams 14 and 18 are displaced least along the y-axis, and most along the x-axis (see FIGS. 3 and 6) so that at the exit of the first sub-element 28, the outlet ports associated with the conduits 40 are in a preferred embodiment stacked generally along the y-axis (FIG. 7).

Preferably, the repositioning described above is effected without substantially changing or distorting the cross-sections of the various branch streams, such as rotating the laminae within a given branch stream with respect to the laminae of another branch stream.

The conduits 40 and outlet ports 44 are preferably also substantially identical in true cross-section to one another and to the square or rectangular inlet openings 34.

Figure 8:
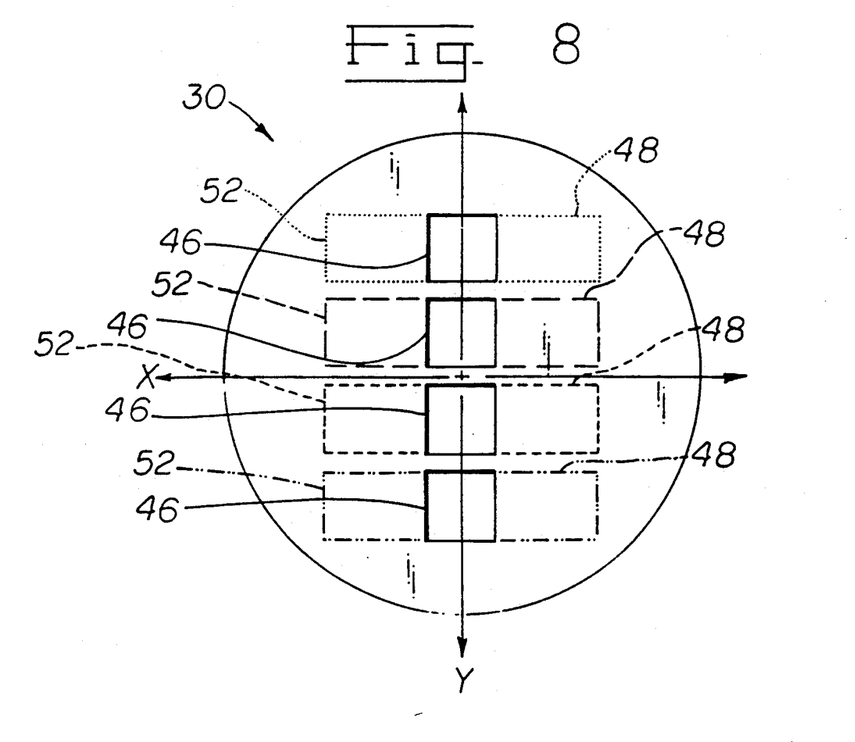
FIG. 8 is a front view of a second portion or sub-element of the apparatus of FIG. 2, showing conduits within the second sub-element corresponding to the conduits in the first sub-element.
Figure 9:
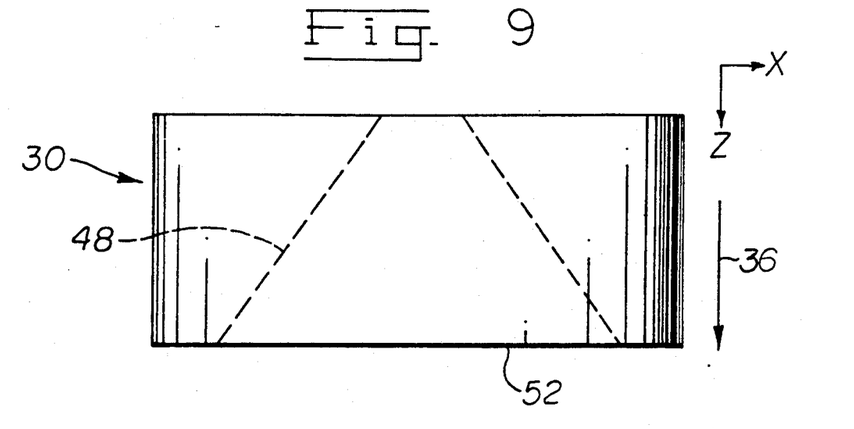
FIG. 9 is a top view of the conduits within the second sub-element of FIG. 8, showing the direction of fluid flow through the conduits and through the second sub-element.
Figures 10, 11:
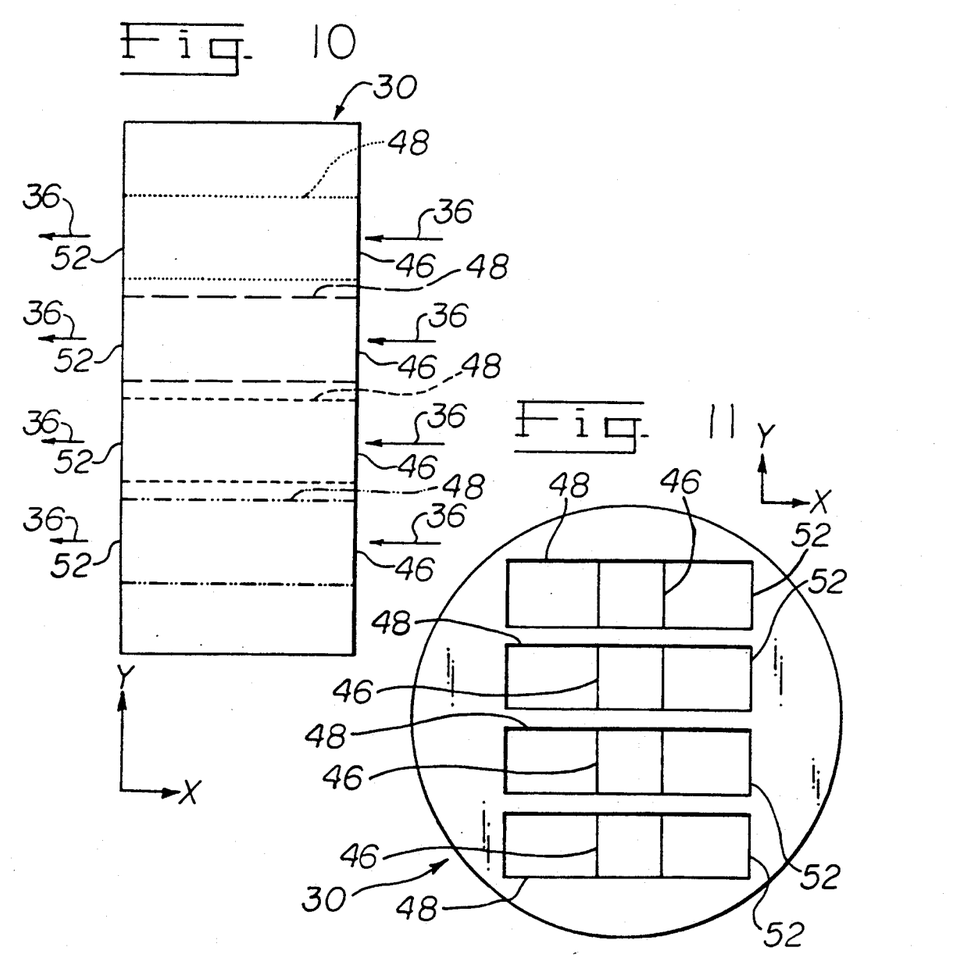
FIG. 10 is a side view of the conduits of the second sub-element, showing again the flow path of fluids through the conduits.
FIG. 11 is a rear view of the second sub-element depicted in FIGS. 8-10.

As may be seen in FIG. 2, and now more particularly in FIG. 8, the outlet ports 44 from the first sub-element 28 communicate with second inlet openings 46 of the second sub-element 30, which second inlet openings 46 are also preferably substantially identically square or rectangular in cross-section to the outlet ports 44 and to one another.

After passing through the outlet ports 44 and second inlet openings 46, the streams 14, 16, 18, and 20 are preferably progressively and symmetrically expanded in their transverse (x) dimension by passage through respective second conduits 48 (see FIGS. 2, 8, 9 and 11).

The second conduits 48 are preferably substantially identically configured to one another in cross-section so as to accomplish a uniform expansion of the branch streams 14, 16, 18 and 20. This common configuration in its preferred form gives the impression of a flattened funnel having a rectangular end portion (FIGS. 8 and 9), so that the branch streams in passing through the second conduits 48 each possess a gradually progressively greater transverse dimension along the x-axis.

Figure 12:
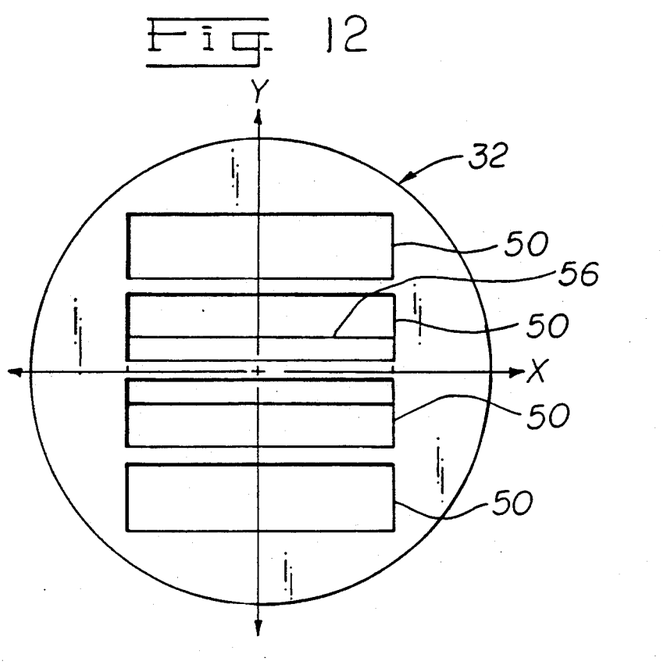
FIG. 12 is a front view of a third sub-element of the apparatus of FIG. 2, showing conduits which correspond at their entrances to the exits of the conduits in the second sub-element, and which converge to a common exit.
Figure 13:
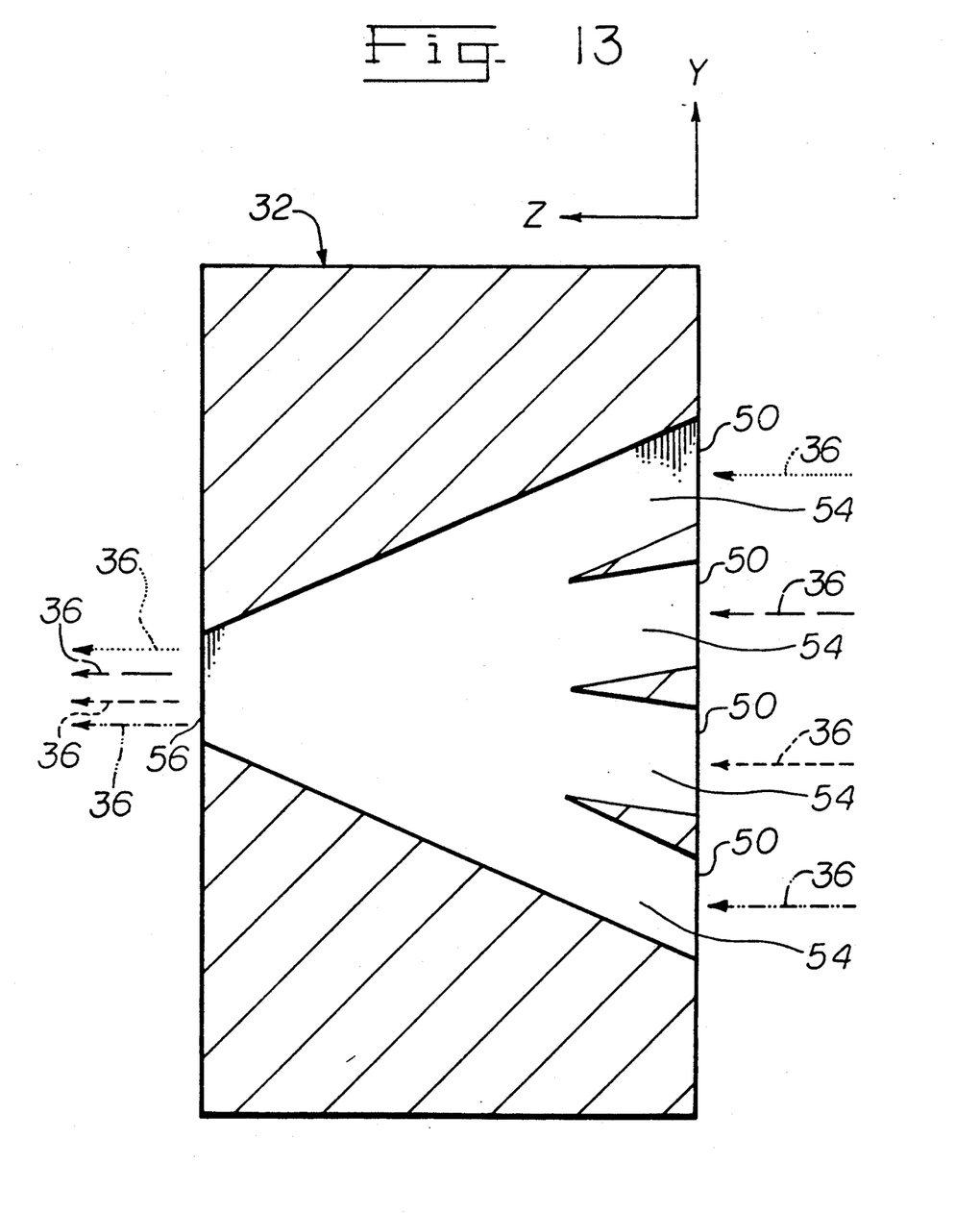
FIG. 13 is a view in cross-section of the convergence of the conduits in the third sub-element of FIG. 12 toward a common exit, showing by arrows the flow path of fluids through the conduits of the third sub-element.
Figure 14:
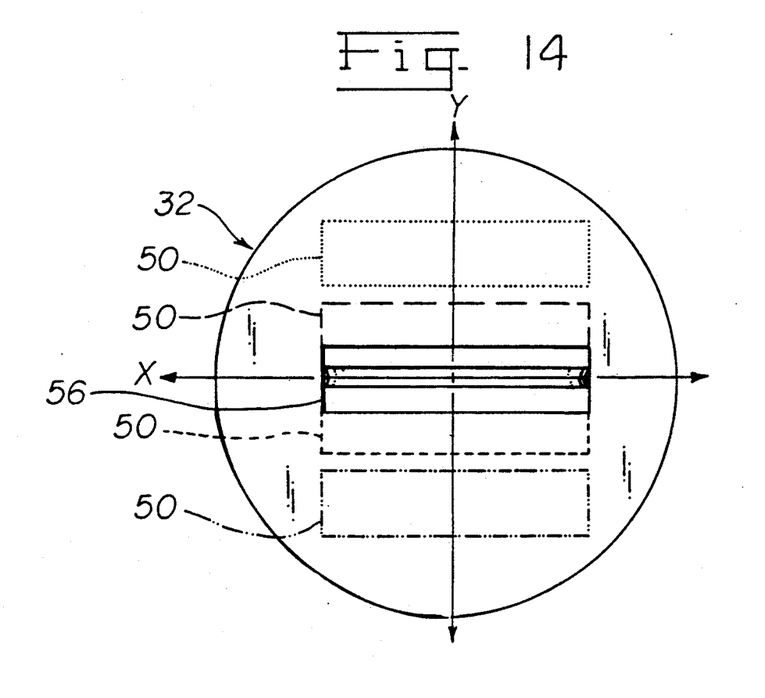
FIG. 14 is a rear or downstream face view of the conduits of the third sub-element as previously shown in FIGS. 12 and 13.

Referring now to FIG. 12, the streams 14, 16, 18, and 20 are then communicated to the third inlet openings 50 of the third sub-element 32 via the outlet ports 52 (FIGS. 8 and 9) of the second sub-element 30, the third inlet openings 50 thus communicating with the downstream ends of the conduits 48 and being preferably substantially identically square or rectangular in true cross-section therewith.

The branch streams 14, 16, 18, and 20 are then conveyed through third conduits 54 which symmetrically and preferably uniformly contract the dimension of the various branch streams in the y- or thickness direction (FIG. 13), and recombine the streams in overlapping relationship so that the second composite stream leaving the device 26 possesses more of the layers 10 and 12 than the first composite stream entering the device 26.

The third conduits 54 are preferably of a basically constant transverse or "x" dimension (FIGS. 12 and 14) and convey or direct the streams passing therethrough toward a common exit 56. This common exit 56, where the apparatus 26 is but one of several such devices in series, will preferably be of substantially the same overall dimensions in the x- and y-directions as the combined inlet openings 34 (FIG. 2).

Figures 15, 16:
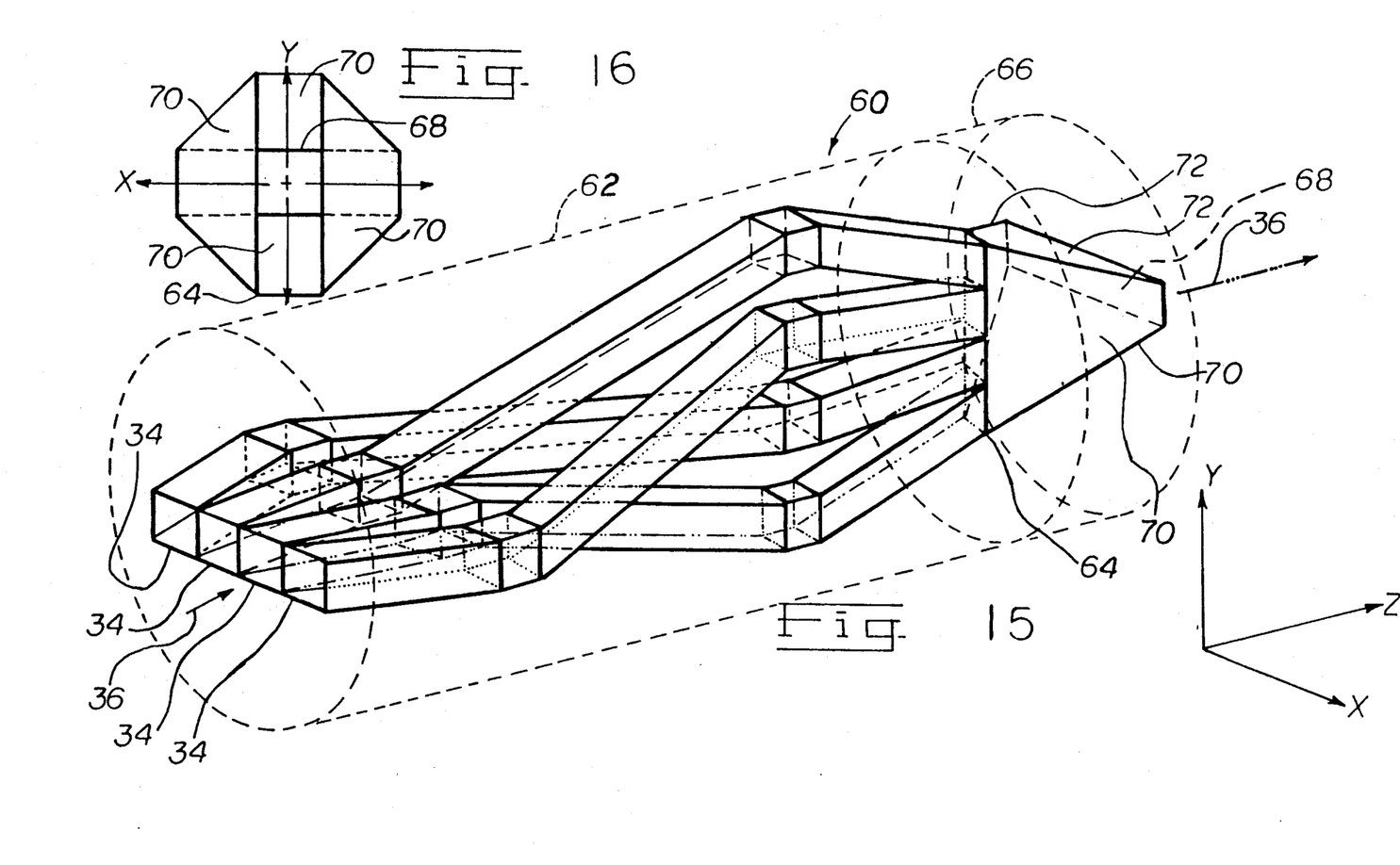
FIG. 15 depicts an alternate embodiment of an apparatus of the present invention, with the conduits and cavities defined therein for fluid flow being shown in solid outline for clarity of viewing.
FIG. 16 is a front view of the second sub-element of the apparatus of FIG. 15.

An alternate embodiment of an apparatus for producing multilayered streams of this character from a first composite stream is shown in dashed outline in FIGS. 15 and 16 and designated by the numeral 60. The embodiment 60 is comprised in part of a first sub-element 62 which, like the first sub-element 28 of the embodiment of FIGS. 2-14, operates to divide a first composite stream into branch streams and reposition the branch streams. A first composite stream flowing in the direction indicated by the arrow 36 is thus divided into four branch streams by inlet openings 34 which are aligned along the x-axis. These branch streams are then in flowing through the conduits 40 repositioned with respect to one another and with respect to the x- and y-axes, so that at the inlet opening 64 of a second sub-element 66 the branch streams are centrally stacked along the y-axis.

Second sub-element 66 of embodiment 60 thereafter symmetrically expands and contracts the recombined branch streams from the inlet opening 64 to an outlet opening 68 aligned with the x-axis. Second sub-element 66 shown in FIGS. 15 and 16 defines a tetrahedral cavity through which the recombined branch streams then flow, the tetrahedral cavity being formed by the intersection of sides 70 in the general form of four truncated isosceles (or equilateral, depending on the dimensions of the inlet opening 64 and outlet opening 68 in the y- and x-directions, respectively) triangles.

A feature of common significance in both embodiments is the symmetrical expansion and contraction of the divided and stacked branch streams in the apparatus 26, or of the second composite stream comprised of the recombined branch streams in the apparatus 60.

A symmetrical expansion in the x- or transverse dimension of the branch streams or of the second composite stream from along the y-axis, rather than unevenly from a peripheral portion of the given apparatus, prevents the bulk of the materials in a given branch stream or in the second composite stream from being funneled or channeled along the near wall of the apparatus relative to such peripheral portion. Distortions in individual layer thicknesses because of this channeling effect (due to the flow path being shorter along the nearer wall as opposed to the far wall) are in this manner discouraged from occurring.

In the same manner, the symmetrical (along the x-axis) reduction of the thickness of the layers in a given branch stream or in the second composite stream is designed to avoid causing distortions in the thickness of such layers along the x-axis or in the transverse direction, as well as to avoid creating flows in the y-direction which might tend to disrupt the thinly-layered character of a branch stream or the second composite stream.

By further contracting the branch streams or the second composite stream uniformly as is preferred, the layers 10 and 12 in a first composite stream may be evenly divided into a large number of thin but continuous layers in the second composite stream whereas a non-uniform contraction of the branch streams could result in some thicker layers of a given material in one branch stream with some discontinuous layers in another branch stream. In some multilayer film applications, for example in the manufacture of multilayer barrier films, it will be particularly advantageous to utilize layers of a material which are both uniformly thin and continuous.

The second composite stream emerging from an apparatus 26 or 60 may itself become the feed stream (i.e., the first composite stream) to a second ISG of the present invention and so on, or may itself be formed into a desired configuration by some suitable method for forming a layered stream of thermoplastic materials into an article, such as by a thermoforming process.

In designing the ISG's of the present invention, it will normally be preferable to have the branch streams or second composite stream manipulated in a gradual manner. But where space for the apparatus is limited, or where there is the potential for degradation of some of the materials in the first composite stream in passing through a feedblock apparatus and one or more of the present ISG's. For example, the overall length of the various elements required in combination to create the desired number of layers may be limited also.

There are a number of options with regard to the design and employment of the ISG's of the present invention under such circumstances, including employing elements constructed according to the teaching of the present invention but with a greater number of channels than the four exemplified herein, shortening one or more of the sub-elements 28, 30 and 32 or 62 and 66, changing the feedblock, or a combination of one or more of these options. The person of ordinary skill in the art is well-equipped to choose from among these options for particular applications of the present invention.

While preferred embodiments of the method and apparatus of the present invention have been described, it will be appreciated that numerous changes in these embodiments can be made which are nevertheless within the scope and spirit of the present invention, as more particularly defined hereafter.

For example, it is considered that the teachings of this disclosure embrace and enable the practice of this invention with elements for dividing a first composite stream into any number of branch streams, rather than just the four which have been exemplified.

Additionally, while it is preferred that an apparatus of the present invention perform both of the expansion and contraction steps of the inventive method, other ways of performing the method could be devised. As an example, in a feedblock-apparatus-die combination the apparatus could perform the expansion step, and the contraction step could occur in the die. Or, the contraction step could occur in the apparatus, with the expansion step occurring in the die.

What is claimed is:

1. A method for generating interfacial surfaces within a first composite stream comprised of discrete overlapping layers of polymeric material, of which at least a pair of such discrete overlapping layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, said method comprising the steps of:
    dividing the first composite stream into a plurality of branch streams along the x-axis, such that the pair of discrete overlapping layers and the generally planar layer interface defined therebetween are distributed among two or more of the branch streams:
    repositioning at least the two or more branch streams among which the pair of discrete overlapping layers and the generally planar layer interface therebetween were distributed along both of the x- and y-axes as the branch streams flow along the z-axis;
    individually symmetrically expanding a transverse dimension of at least the two or more branch streams along the x-axis:
    individually symmetrically contracting the thickness of at least the two or more branch streams along the y-axis; and
    recombining the branch streams in overlapping relationship to form a second composite stream which comprises a greater number of discrete overlapping layers of polymeric material than the first composite stream.

2. A method as defined in claim 1, wherein the branch streams are expanded uniformly.

3. A method as defined in claim 1, wherein the branch streams are contracted uniformly.

4. A method as defined in claim 1, wherein the first composite stream is divided into a plurality of branch streams of substantially identical rectangular or square cross-section.

5. A method as defined in claim 1, wherein the step of repositioning the branch streams is accomplished without significantly altering their cross-sections.

6. A method as defined in claim 1, wherein the step of repositioning the branch streams includes divergently displacing the branch streams along the y-axis and convergently displacing the branch streams along the x-axis.

7. A method as defined in claim 1, wherein the first composite stream is divided into an even number of branch streams.

8. A method as defined in claim 1, wherein at least some of the discrete, overlapping layers in the first composite stream are of a generally planar, substantially continuous nature and span the first composite stream along the x-axis.

9. A method as defined in claim 8, wherein the branch streams are recombined whereby the second composite stream comprises a greater number of discrete, generally planar and substantially continuous layers than the first composite stream.

10. A method of generating interfacial surfaces within a first composite stream from a feedblock, the stream being comprised of discrete overlapping layers of polymeric material of which at least a pair of such discrete overlapping layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, wherein said method consists essentially of:
    dividing the first composite stream into a plurality of branch streams along the x-axis, such that the pair of discrete overlapping layers and the generally planar layer interface defined therebetween are distributed among two or more of the branch streams;
    repositioning at least the two or more branch streams among which the pair of discrete overlapping layers and the generally planar layer interface therebetween were distributed along the y-axis as the branch stream flow along the z-axis;
    recombining the branch streams in overlapping relationship to form a second composite stream which comprises a greater number of discrete overlapping layers of polymeric material than the first composite stream;
    symmetrically expanding a transverse dimension of the second composite stream along the x-axis; and
    symmetrically contracting the thickness of the second composite stream in the y-direction.

11. A method as defined in claim 10, wherein the first composite stream is divided into a plurality of branch streams of substantially identical rectangular or square cross-section.

12. A method as defined in claim 10, wherein the step of repositioning the branch streams is accomplished without significantly altering their cross-sections.

13. A method as defined in claim 10, wherein the step of repositioning the branch streams includes divergently displacing the branch streams along the y-axis and convergently displacing the branch streams along the x-axis.

14. A method as defined in claim 10, wherein the first composite stream is divided into an even number of branch streams.

15. A method as defined in claim 10, wherein at least some of the discrete, overlapping layers in the first composite stream are of a generally planar, substantially continuous nature and span the first composite stream along the x-axis.

16. A method as defined in claim 15, wherein the second composite stream after being expanded and contracted comprises a greater number of discrete, generally planar and substantially continuous layers than the first composite stream.

17. A method of making a multilayered plastic article, comprising the steps of:
forming a second composite stream according to the method of claim 1; and
molding the second composite stream into a desired configuration.

18. A method of making a multilayered plastic article, comprising the steps of:
forming, expanding and contracting a second composite stream according to the method of claim 12; and
molding the second composite stream into a desired configuration.

19. An apparatus for generating interfacial surfaces within a first composite stream comprised of discrete overlapping layers of polymeric material, of which at least a pair of such discrete overlapping layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, wherein said apparatus comprises:
dividing means for dividing the first composite stream into a plurality of branch streams along the x-axis, such that the pair of discrete overlapping layers and the generally planar layer interface defined therebetween are distributed among two or more of the branch streams;
a plurality of first conduits for repositioning the branch streams along both the x-axis and the y-axis;
a plurality of second conduits in fluid communication with the first conduits, with each second conduit having a progressively greater transverse dimension along the x-axis from an inlet opening to an outlet port thereof, the inlet opening being positioned centrally in the apparatus;
a plurality of third conduits in fluid communication with the second conduits, with each third conduit having a dimension in the y-direction which becomes progressively lesser from an inlet opening to an outlet port thereof; and
means for recombining the branch streams from the third conduits to form a second composite stream which comprises a greater number of discrete overlapping layers of polymeric material than the first composite stream.

20. An apparatus for generating interfacial surfaces within a first composite stream comprised of discrete overlapping layers of polymeric material, of which at least a pair of such discrete overlapping layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, wherein said apparatus comprises:
dividing means for dividing the first composite stream into a plurality of branch streams along the x-axis, such that the pair of discrete overlapping layers and the generally planar layer interface defined therebetween are distributed among two or more of the branch streams;
a plurality of first conduits for repositioning the branch streams along both the x-axis and the y-axis; and
a conduit wherein the branch streams are recombined and symmetrically expanded and contracted, said conduit defining a tetrahedral cavity through which the recombined branch streams flow, the cavity being formed by the intersection of sides of the conduit in the general form of four truncated isosceles or equilateral triangles.

* * * * *

UNITED STATES PATENT AND TRADEMARK OFFICE
CERTIFICATE OF CORRECTION

PATENT NO. : 5,094,793

DATED : March 10, 1992

INVENTOR(S) : Schrenk, et al.

It is certified that error appears in the above-identified patent and that said Letters Patent is hereby corrected as shown below:

Col. 8, claim 10, line 49, "stream" should read --streams--.

Col. 9, claim 18, line 26, "claim 12" should read --claim 10--.

Signed and Sealed this

Twenty-ninth Day of June, 1993

Attest:

MICHAEL K. KIRK

Attesting Officer

Acting Commissioner of Patents and Trademarks